United States Patent [19]
Bottenberg

[11] 3,886,547
[45] May 27, 1975

[54] RADAR DEVICE WITH A DIRECTIONAL ANTENNA

[75] Inventor: Hans Bottenberg, Munich, Germany

[73] Assignee: Siemens Aktiengesellschaft, Berlin & Munich, Germany

[22] Filed: Mar. 19, 1973

[21] Appl. No.: 342,459

Related U.S. Application Data

[63] Continuation of Ser. No. 38,432, May 18, 1970, abandoned.

[52] U.S. Cl. ......... 343/100 SA; 343/5 R; 343/11 R; 343/16 R
[51] Int. Cl. .............................................. G01s 3/74
[58] Field of Search ........... 343/100 SA, 16 R, 5 R

[56] References Cited
UNITED STATES PATENTS

| | | |
|---|---|---|
| 3,406,399 | 10/1968 | Alsberg ...................... 343/100 SA |
| 3,448,450 | 6/1969 | Alfandari et al. ................. 343/16 R |
| 3,568,184 | 3/1971 | Drabowitch .................. 343/100 SA |

*Primary Examiner*—Maynard R. Wilbur
*Assistant Examiner*—Richard E. Berger
*Attorney, Agent, or Firm*—Hill, Gross, Simpson, Van Santen, Steadman, Chiara & Simpson

[57] ABSTRACT

A radar device and a directional antenna provide for transmission of and echo reception of a plurality of different radar signals, the number of radar signals being selected in accordance with the proportion of the required distance resolution and the actually available resolution of the directional antenna.

9 Claims, 9 Drawing Figures

INVENTOR
HANS BOTTENBERG

ATTORNEYS

Patented May 27, 1975 3,886,547

INVENTOR
HANS BOTTENBERG

BY *Hill, Sherman, Meroni, Gross & Simpson* ATTORNEYS

RADAR DEVICE WITH A DIRECTIONAL ANTENNA

This is a continuation of application Ser. No. 38,432, filed May 18, 1970, now abandoned.

BACKGROUND OF THE INVENTION

1. Field of the Invention

The invention relates to a radar device with a directional antenna which is composed of a plurality of individual radiators and in which the individual radiators are supplied from a central feeding device via adjustable phase changers in a way that the maximum phase differences, or rather path-length differences, between the feed conduits do not exceed 360°, or a wave length.

2. Description of the Prior Art

It is customary to use antennas for pulse radar devices which are composed of a plurality of fed individual radiators. Such antenna arrangements are also often called "Phased-Array Antenna." To attain the operation that the signals will arrive co-phasal at the place of reception, signal bypasses are switched into the feed lines, which bypasses have a certain length. With this manner of feeding there is a broad-band solution in which the electrical path from the transmitter to the place of reception where all signals are to arrive co-phasally is of the same length for all fed individual radiators. Thus, frequency distortions, too, have a uniform effect on all radiation portions which come from the individual radiators, and the phase coincidence at the place of reception remains independent of the frequency distortion. This however, is valid only as long as the feed lines themselves have the same frequency dependence in their travel times. This manner of feeding offers, in spite of these advantages, difficulties inasmuch as for some individual radiators long bypasses become necessary and an exact adjustment of the length of a bypass presents tolerance problems in practice.

In addition to the foregoing a narrow-band solution is known which resides in the fact that the individual radiators are supplied from a central point of feeding via phase changers, having maximum length differences which do not exceed one wave-length, i.e., 360°.

SUMMARY OF THE INVENTION

It is the primary object of this invention to produce a relation between the radar device on one hand and the directional antenna on the other hand, with the radar device operating with a directional antenna, which relation enables an optimum utilization of the possibilities which appear with this kind of antenna.

According to this invention, which relates to a radar device of the above described kind, this is attained due to the fact that the radar device sends out several radar signals simultaneously with frequencies which are different, at least to such degree that the corresponding echo signals can still be processed separately, and that the number of the radar signals which are different with regard to their frequency, is elected as a maximum according to the proportion between the required resolving and the highest actual resolving attainable.

BRIEF DESCRIPTION OF THE DRAWINGS

Other objects, features and advantages of the invention will be best understood from the following detailed description thereof, taken in conjunction with the accompanying drawings, in which.

DESCRIPTION OF THE PREFERRED EMBODIMENT

Figure 1:
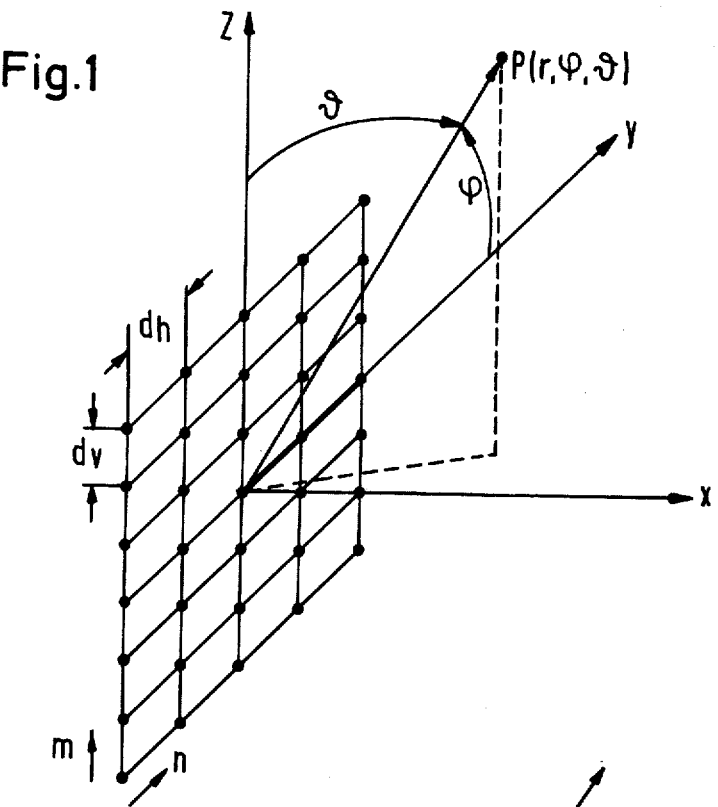
FIG. 1 diagrammatically illustrates a directional antenna arrangement in a perspective view.

A columns. Phased-Array antenna consists of a plurality of individual radiators, for instance dipoles which mostly are fixed to a plane base in M rows and N columns. In FIG. 1 these individual radiators are indicated as points on a $y$, $z$ plane of an $x$, $y$, $z$ coordinate system. The signals of all of these elements arrive co-phased at a place of reception P when bypasses or respective phase deflections of the length $\Delta L$, in accordance with the expression $\Delta L = m \cdot l_v + n \cdot l_h - k \cdot \lambda_o$ where $K$ is an interger 1, 2     (1) are switched electronically into their feed lines, wherein $m$ is the row and $n$ the column in which the regarded element is located, and $\lambda_o$ the wave length. The magnitudes $l_v$ and $l_h$ state the difference of the bypasses between two elements lying respectively in horizontal or in vertical alignment. They depend on the angles $\phi$ and $\theta$, and are furthermore proportional to the element distance measured in row direction $(d_h)$ or in column direction $(d_v)$:

$$l_v = d_v \cdot \cos\theta; \quad l_h = d_h \cdot \cos\phi \quad (2)$$

The angles $\phi$ and $\theta$ are hereby measured between direction to the target P and direction of the antenna line ($y$ axis) or in direction of the antenna column ($z$ axis), respectively.

Except for this bypass $\Delta L$, the respective phase distortion for deflecting the antenna beam, additional bypasses $L_F$, corresponding phase distortions, may possibly also be necessary to even out a different electric path length between the transmitter and the individual radiators (focusing). The influence of the focusing phase on the antenna gain is small when the angle is perpendicular between the antenna line and the antenna beam. Thus, such influence will not be regarded in the following.

With the so-called narrow-band feeding of the individual radiators, according to expression (1), the distance $k \cdot \lambda_o$ is subtracted from $\Delta L$ ($k = 0,1,2,\ldots$), until the bypass $\Delta L$ becomes smaller than the wave length and thus the phase difference becomes smaller than 360°. The changeable bypass lines or rather phase changers, thus have a maximum variation of the bypass of only one wave length or rather one phase change of 360°. Thus a very exact adjustment of the requirements set forth in expression (1) is possible.

The greatest magnitude (K) of the parameter $k$ is given in the element in the outer row and column (in FIG. 1 above right). Here K is, according to expression (1)

$$K = N \cdot d_h/\lambda_0 (\cos\phi)_{max} + M \cdot (d_v/\lambda_0)(\cos\theta)_{max} - (\Delta L/\lambda_0) \quad (3a)$$

Thereby $\phi$ max and $\theta$ max are the extreme deflection angles. In most cases N and M are large numbers (10 ... 100). The term $\Delta L/\lambda_0$ can thus be left out for an approximation approach. With the most common distance $(d_h, d_v)$ of the individual radiators, from $(\lambda_0/2)$, there will result from the above expression (3a)

$$K \approx \tfrac{1}{2} [N \cdot (\cos\phi)_{max} + M \cdot (\cos\theta)_{max}] \quad (3)$$

If very broad frequency bands (several octaves) are operated, the field strength at the reception place will become frequency dependent, with the narrow-band resolution, even then when the radiation properties of the individual radiators are not dependent on the frequency. This shall be explained with the help of FIG. 2, where a column of a directional antenna is illustrated with $M = 10$ individual radiators, which are numbered with 0 through 9. The distance of the lines $(d_v)$ are $(\lambda_0/2)$. The beam shall lie in the drawing plane $(x, z$ plane of FIG. 1), whereby $\phi = 90°$ and $\theta$ is assumed to be 33.6°.

The individual radiators 0 through 9 are fed over conduits L0 through L9, respectively. Thereby it is assumed that the phase differences between the individual radiators are adjusted by means of the provision of differently long line lengths. To obtain an in-phase condition at a far-away place of target, the travel-way difference between the radiations of the individual radiators are to be evened out by means of the length of the feed lines. The feed lines of the individual radiator 9 are, during broad-band feeding, more than 3 $\lambda_0$ longer than that of the individual radiator 0. With narrow-band feeding, path difference greater than one wave length $\lambda_0$, which means phase differences of more than 360°, are not applied in the feed lines. Therefore, the need for the thinly illustrated portions of the feed lines L0 through L9 is eliminated, the points L9B as well as L9A as well as L8B and L8A being connected with each other directly, which means, without such intermediate line portions. The remaining thickly-illustrated feed lines from the transmitter S to the individual radiators differ from one another, together with possible phase changes, electrically less than $\lambda_0$, i.e. they bring only phase distortions between the individual radiators of less than 360° on the whole.

The length difference $\Delta L$ has become $\lambda_0$ at the wave fronts which have been drawn vertically to the radiation direction, and $k$ increases over an amount of one, according to the stated rule. The magnitudes of $k$ are illustrated on FIG. 2. After a sudden switching-in of the transmitter, that signal portion will be registered first at the reception place which stems from the elements in which $k$ has its highest magnitude. In the present example these are the signals which proceed from the lines 9 and 8. After this the signal increases staircase-like until it reaches its end magnitude after $K \cdot T_0$, where $T_0$ is the oscillation duration of the base frequency $f_0$. Details hereto can be seen in FIG. 3 where proceedings from the directional antenna according to FIG. 2 with $K = 3$, the curve 1 results for four stages. The first stage is caused by the radiation of the individual radiators 9, 8, the wide stage by that of the individual radiators 7, 6, 5, the third stage by that of the individual radiators 4, 3 and the last stage by that of the individual radiators 2, 1, 0.

Figure 3:
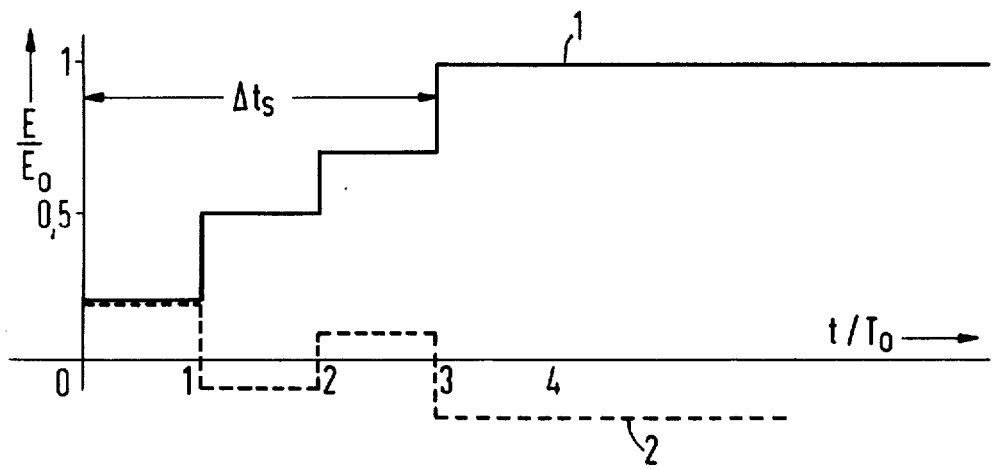
FIG. 3, graphically illustrates the building-up process of field strength at the place of a target during signal reflection along a column.

If the signal frequency is only half as large, the adjusted maximum bypass of the changeable line corresponds only to half a wave length. Successive portions of the signal then only compensate in the direction ($\phi$; $\theta$), as the broken line curve 2 in FIG. 3 shows. This interference effect appears with all frequencies according to the expression $$f_s = (2p+1) \cdot (f_0/2); p = 0, 1, 2 \ldots \quad (4)$$

With the intermediate magnitudes determined in accordance with the expression $$f_d = p \cdot f_0; p = 0, 1, 2 \ldots \quad (4a)$$

wherein the individual portions add up to a maximum of the signal in direction ($\phi$; $\theta$). The periodic frequency dependance of the signal corresponds to the properties of a comb filter. This is exactly valid as long as the electric length or the travelling time of the changeable line is independent of the frequency. Otherwise the minima and maxima of the field strength follow one after the other in uneven distances. The interferences caused by the bypass lines are really travelling-time distortions. They correspond to the so-called echo distortions in information transmission.

In the following, the band width of the directional antenna means the difference between the frequencies, at which the antenna gain is smaller for an amount of 3 $d$B than the maximum at the base frequency $f_0$ is meant by bandwidth of the directional antenna.

If the wave length $\lambda$ differs from the average $\lambda_0$, then the phases before and after a change in the valve of $k$ are uneven. The length of the bypass jumps, or steps, namely at a rate of $\lambda_0$ and not $\lambda$, which makes the antenna gain frequency-dependent.

Figure 2:
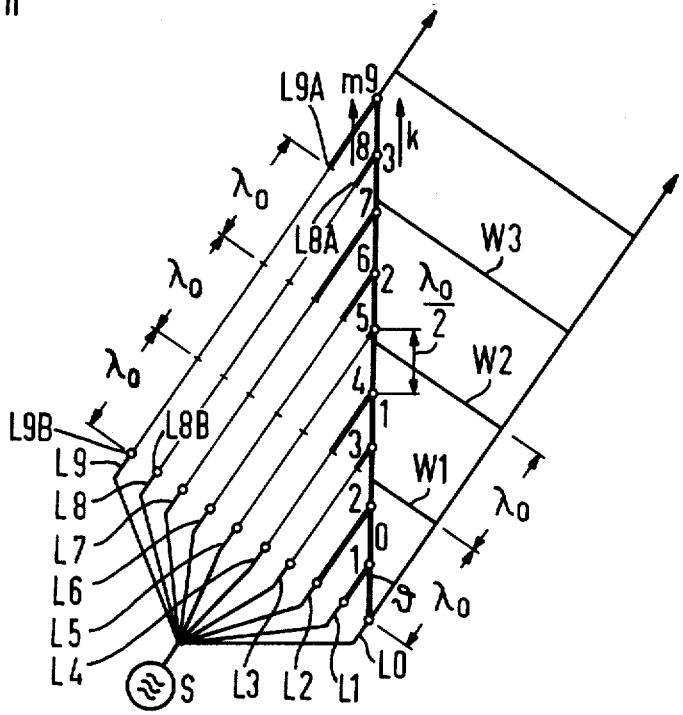
FIG. 2, is a side elevation of a directional antenna according to FIG. 1.

With the help of a deflection in the direction of a column (FIG. 2; $\phi = 90°$, $\theta$ variable), the band width is to be calculated. The path error with a step of $k$ is $$\Delta 1 = |\lambda - \lambda_0| = \Delta\lambda$$

The path error between the lowest and the medium line is $$\Delta 1 = (K/2)\Delta\lambda$$

the path error between the second line from below and the line above the middle, etc., is just as large. In this way the antenna can be divided into line pairs which, among themselves, have the same path error. If this path error corresponds to a quarter of a wave length $\lambda/4$, the far field portions of all line parts overlap with a phase difference of 90°. Through this the field strength declines according to 3 $d$B. The requirements for the limiting frequency $f_3$ thus are therefore $$\Delta 1 = (K/2) \Delta\lambda = (\lambda/4)$$
$$(\Delta\lambda/\lambda) = (\Delta f_3/f) = (1/2K) \quad (5)$$

which, if expression (3) is applied, results in $$(\Delta f_3/f) = [1/M \cdot (\cos\theta)_{max}] \quad (5a)$$

The height extension of the antenna is $$h = M \cdot d_v = M \cdot \lambda_0/2 = M \cdot c/2f_0$$
$$M = (h \cdot 2f_0/c) - \quad (6)$$

Thus the 3 $d$B band width of the antenna according to equation (5a) is $$2 \Delta f_3 = [c/h \cdot (\cos \theta)_{max}] \qquad (7)$$

if in a first approximate $f \approx f_o$.

In a radar installation or facility the same antenna is often used for transmitting and for receiving. Here the band width due to the distance of the 1.5-dB-points in the frequency curve of the gain is essential. The phase error of a line pair may then only amount to 65.5°. The band width then reduces over the proportion of the phase errors (65.5°/90°) = 0.728 to $$2 \Delta f_{1.5} = [0.728 \cdot c/h \cdot (\cos\theta)_{max}] \qquad (8)$$

Figure 4:
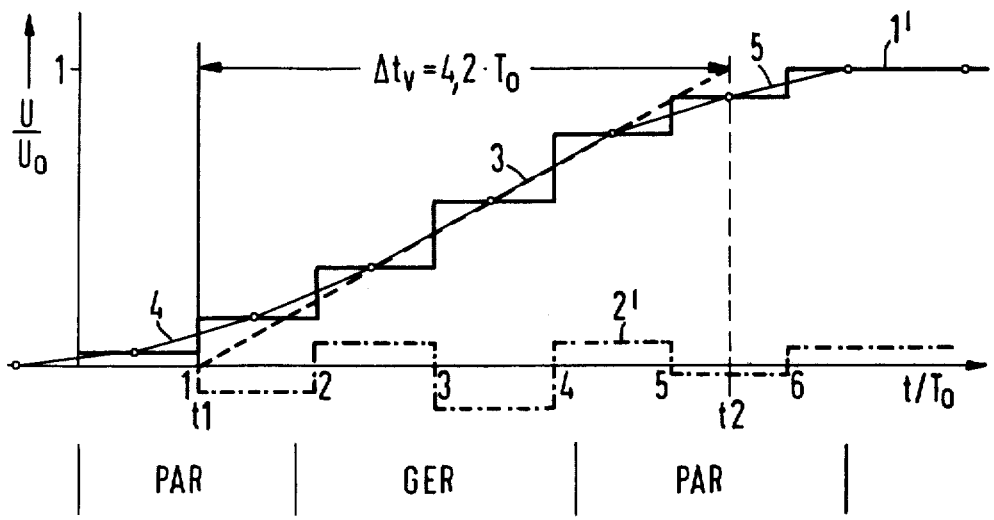
FIG. 4 graphically illustrates the building-up process of the receiving (echo) voltage at the antenna inlet during deflection along a column.

Due to the "travelling-time distortion" described hereinbefore, according to FIG. 3, the field strength at the place of the radar target does not step once to its end magnitude after a sudden switching-on of the transmitter; the amount of the field strength increases in $K + 1$ stages in a staircase-like manner. When the radar echo is received with the same antenna, a travelling-time distortion of the signal occurs once more. Due to this the staircase pattern is broadened to $2K + 1$ stages, as is shown in FIG. 4. The stage height is much greater in the center than at the edges. With a pure deflection in the column direction, the centers of the stages lie on a curve $1'$, which can be approximated by means of two squared parabolas 4 and 5 (PAR) which are connected with each other by means of a length of a straight line 3 (GER). The tops of the parabolas 4, are at the end points of the staircase. The straight line cuts the lines $U = O$ and $U = U_o$ in the points $t_1$ and $t_2$. The time difference $\Delta t_v$ between these points is determined by the expression $$\Delta t_v \approx t_2 - t_1 \qquad (9)$$

and shall be defined as the practical building-up period of the staircase curve. It results from the geometric observation with pure deflection in column direction to $$\Delta t_v \approx 0.6 (2K + 1) \cdot T_o \qquad (9)$$

where $T_o$ is the duration of the oscillation of the high-frequency signal. The curve for the double operation frequency is designated with $2'$. With a diagonal deflection (i.e., in row and column direction) of the beam, the entire duration of the building-up process is increased as opposed to the cases treated hereinbefore, since both $\cos\theta$ as well as $\cos \phi$ are different from zero. Due to this, K, according to equation (3), and thus the length of the staircase, become larger.

Figure 5:
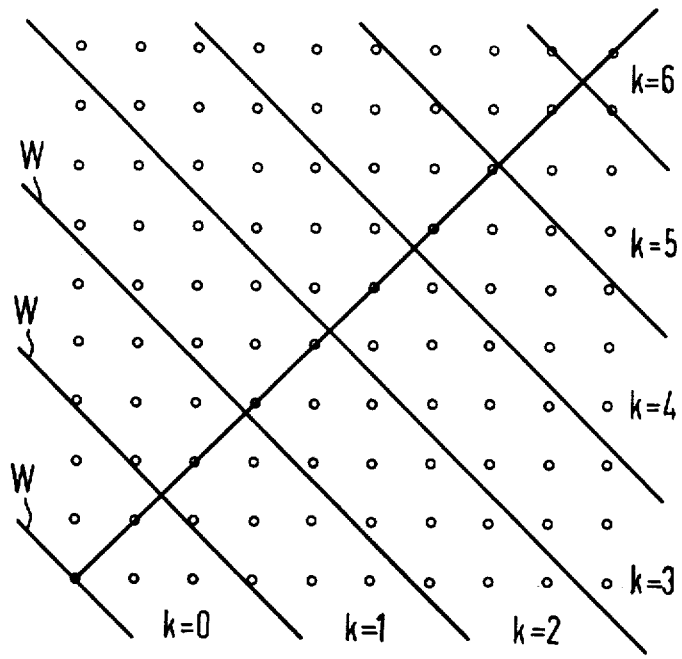
FIG. 5 shows the antenna in a frontal view.
Figure 6:
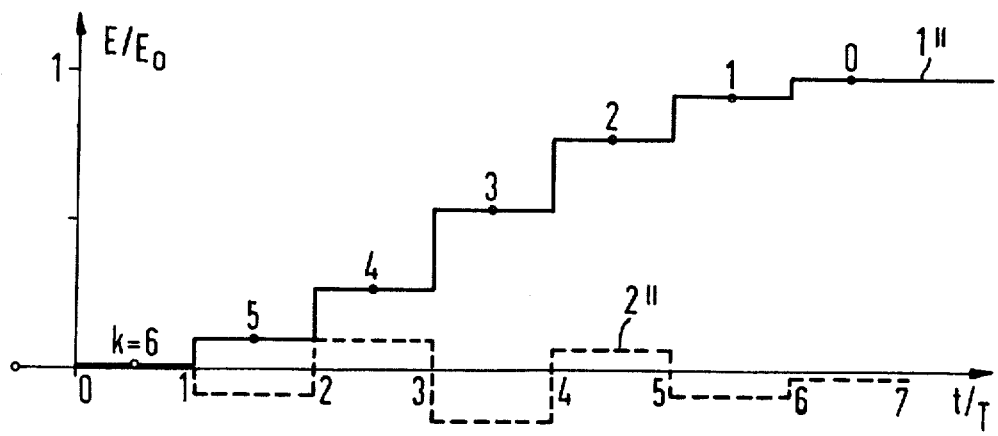
FIG. 6 graphically illustrates the building-up process of field strength at the place of a target during diagonal reflection (in columns as well as in rows)

This is shown in FIG. 5. Here a directional antenna with 10 rows and columns each, thus one hundred individual radiators, which are indicated by means of circles, has been assumed. The angles $\phi; \theta = 60°$ have been selected to define the deflection angle. In FIG. 5 the course of the wave fronts W can be seen while one looks at the antenna. At the place of the lines W, the bypass reaches integral multiples of the wave length. Due to this, $k$ then accordingly increases over one. Only the few elements in the corners of the directional antenna are associated with and correspond to the high and low magnitudes of $k$ (0.6). Thus, there results the uneven increase of the building-up of a staircase pattern at the place of the target which is shown in FIG. 6.

Figure 7:
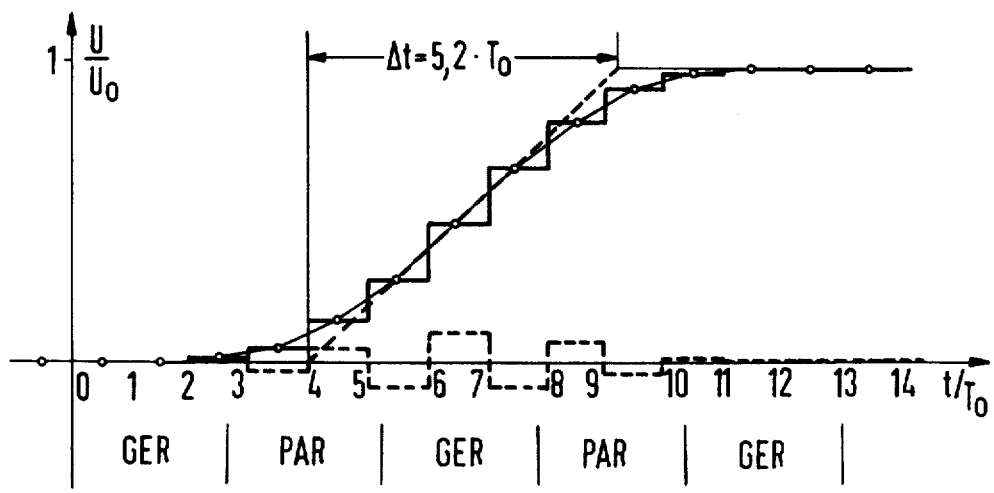
FIG. 7 graphically illustrates the building-up process of the receiving (echo) voltage at the antenna inlet during diagonal reflection (in columns as well as in rows)

If the signal which is reflected at the target is received again, a staircase curve $1''$ results as a terminal voltage of the antenna, the first and last stages of which are so small that they cannot be seen any more on the drawing in FIG. 7. The centers of the stages can be connected here by means of a curved path (series of curves) which can be approximated in chapters, or segments by means of alternate straight line segments (GER), and parabolic segments (PAR). The abscissas of these curve pieces are about of the same length among themselves. After this approximation there results, from the increase of the targent in the steepest point of the curve, a building-up time of $$\Delta t_d 0.4 (2K + 1) \cdot T_o \qquad (10)$$

This long building-up process renders impossible a separation of echo signals of two targets which are situated closely one behind the other. The distance $\Delta r$ of two targets is now to be defined as an interference limit, at which the echo signals return shifted for an amount of exactly $\Delta t$. If a short impulse is supposed as the transmitting signal and if it is assumed that no great interferences will occur due to building-up processes in the receiver or noise, then the dip between two even sized signals which are shifted with regard to each other over $\Delta t$, is on an average exactly 50 percent of the maximum amplitude. Such two signals are to be regarded as separately recognizable in the following when their centers are at a distance of $\Delta t$ or a longer time from each other.

With a vertical deflection, when the magnitude of K is applied according to equation (3)

$$\Delta t_v = 0.6 (2K + 1) T_o = 0.6 (M \cdot \cos\theta + 1) T_o$$

The expansion $h$ of the antenna in the direction of the columns was $$h = M \cdot d_v = M (\lambda_o/2) = M \cdot (cT_o/2) \qquad (6)$$

Thus the building-up time is $$\Delta t_v = 0.6 [(2h/c) \cdot \cos\theta + T_o] \qquad (11)$$

According to the above definition, a resolution of the distance of $$\Delta r_v = \frac{1}{2} c \cdot \Delta t_v$$

corresponds to this. Thus $$\Delta r_v = 0.6 (h \cdot \cos\theta + \lambda_o/2 \qquad (12)$$

while deflecting in the direction of the columns. While deflecting the antenna beam in the direction of the rows ($\theta = 90°$) over $\phi$, there results analogue for the distance resolution $$\Delta r_h = 0.6 (b \cdot \cos\phi + \lambda_o/2) \qquad (13)$$

$b$ thereby is the geometric width of the antenna. Accordingly $$\Delta r_d = 0.4 [b \cdot \cos\phi + h \cdot \cos\theta + (\lambda_o/2)] \qquad (14)$$

is valid for the distance resolution with diagonally deflected antenna beam ($\phi = \theta$). The equations (12) through (14) can be transformed into a closed form for a squared antenna ($h = b$), with which the distance resolution with any angle pairs desired ($\phi, \theta$) can be estimated $$\Delta r \approx 0.6 \cdot h \sqrt{\cos^2\phi + \cos^2\theta} + (\lambda_o/2)$$

The distance resoltuion ability of the phased-array antenna with a controllable bypass or changeable phase changer in the feed line of each element lies in the magnitude range of the measures of the antenna. According to $$\Delta\gamma = \sqrt{\Delta\phi^2 + \Delta\theta^2} = 65° \cdot (\lambda_o/h)$$

the angle resolution decreased simultaneously with increasing distance resolution (small antenna). The product of both resolution the surface of the resolution square $$\Delta\gamma \cdot \Delta r = 40° \cdot \lambda_o \sqrt{\cos^2\phi + \cos^2\theta}$$

thus is independent from the antenna dimensions ($b$, $h$). A decrease of the resolution square can only be obtained by means of an increase of the frequency or a decrease of the sensing-angle range.

If the distance resolution of the phased-array antenna with narrow-band detour lines is to be fully utilized, the building-up time $\Delta t_e$ of the receiver which is arranged at the load side of the antenna may only be half as long as that of the antenna $\Delta t$. The band width of the high-frequency channel of $$2 \Delta f_e = (1/\Delta t_e)$$

corresponds to this. By means of comparison of the expression (8) and (11), the ratio $2 \Delta f_{1.5} = (0.9/\Delta t_v - 0.6 T_o) \approx (1/\Delta t_v)$ (18)

will result if the term is neglected with respect to $T_o$. With an equal building-up time of antenna and receiver $$\Delta t_v = \Delta t_e$$

therefore the corresponding band widths are the same.

When fully utilizing the distance resolution, the antenna thus can transmit a radar signal "without distortion." Most times the required magnitude for the distance resolution is much worse than the one obtainable in a limiting case. Advantageously, then the band width of the radar signal can be made much smaller than the band width of the phased-array antenna. Due to this it is possible to transmit with the antenna several radar signals simultaneously on adjacent frequencies.

If, for instance, the directional antenna has dimensions of $b = 5 \lambda_o$ and $h = 5 \lambda_o$ as well as $\cos\theta = 0.5$ ($\theta, \phi = 60°$), so the distance resolution, according to (14) is about $\Delta r_d = 2.2\lambda_o$. With the very small wave lengths which are customary with such directional antennas, for instance in the cm-range, this distance resolution is not critical and therefore not needed, and a resolution of, for instance, 22 $\lambda$ is sufficient. The ratio between required distance resolution and the actual available resolution which is achievable with the given directional antenna has the magnitude of 10 in this case. This means that simultaneously a maximum of ten frequency-wise different radar signals can be transmitted by the radar device, whereby the frequencies of these radar signals must merely have at least such a difference that the corresponding echo signals can still be processed separately. Essential therefore is mainly the selectivity of the radar receiver whereby advantageously a corresponding receiver is provided for each of the radar signals. With the help of a feeding device which is nearer described below, there results the possibility to guide main radiations of different frequencies in different directions respectively. Due to this, the entire coverage of the directional-antenna arrangement can be examined faster for radar targets. Furthermore, it is possible to sense the same direction with the different frequencies one after the other. Thus, information about the extension and shape of the target can be obtained. It is thus also contemplated to sense different distance ranges with the individual radar signals, which are different frequency-wise, and thus carry out a division into near, medium and farther distant targets, for instance.

Advantageously, the number of the frequency-wise radar signals will be chosen somewhat smaller than the ratio between the required distance resolution and the obtainable limitation resolution. This is due to the fact tht filter for the separation of frequency wise directly adjacent signals are not available. Thus, unused areas have to be inserted between the frequency ranges of the individual radar signals, within which the transit of the filters from a permeable to a blocking condition can be effected.

Figure 8:
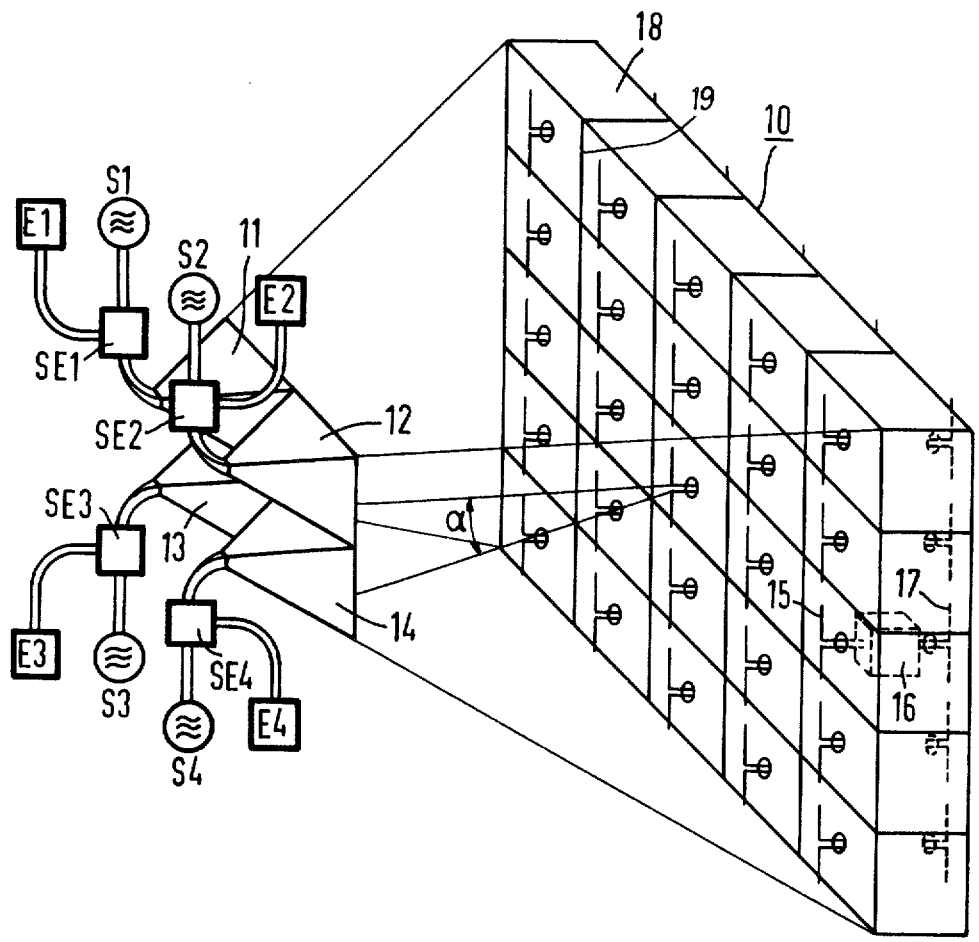
FIG. 8 illustrates an exemplary embodiment of the invention.

In FIG. 8, a simple directional antenna arrangement 10 is illustrated as sample embodiment of this invention, which arrangement operates with four radar signals in the whole which are frequency wise different. The directional antenna consists of 25 individual dipoles as individual radiators which are arranged at one side of a block 18 which is provided with radiation-proof separation walls 19, which radiators are loaded with four frequency wise different radar signals by four horn radiators 11 through 14. These radar signals are produced in transmitters S1 through S4 and reach the horn radiators 11 through 14 via transmission-reception switches SE1 through SE4. These transmission reception switches guide the returning echo signals to the respective radar receivers E1 through E4 in accordance with techniques well known in the prior art. The distance of the horn radiators 11 through 14 and the lateral expansion of the directional-antenna arrangement 10 is selected in a way that, if possible, no radiation can get into the space on the right-hand side of the directional antenna, passing the block 18.

The individual radiators of the directional-antenna arrangement 10 which are here represented in vertical polarization are excited by means of the frequency-wise different radiations of the horn radiators 11 through 14 during transmission operation, and they guide their receiving voltage via phase changers which give the signals further to the individual radiators which lie behind the block 18, whereby the side surfaces of the block operate as separation walls 19 and are not permeable for the radiation. For simplification a phase changer 16 has only been drawn for the individual radiator 15; the corresponding dipole radiator at the right hand side of the outer wall of the block 18 is designated with 17. At the right side of the outer wall of the block 18, just as many individual radiators can be arranged as on the left side. Then also the number of phase changers is the same as the number of individual radiators on a side of the block 18, here 25. However, it is also possible to obtain a reduction of the number of phase changers 16 according to prior art, by combining several individual radiators on the left side of the box 18 with only one phase changer and one individual radiator on the right side. The adjustable phase changer 16, which preferably is controlled electrically, produces, together with the line portions inbetween, the necessary phase deflection for the individual radiator 17, and this is effected in the manner which is explained in connection with FIG. 2 (narrow-band feeding) for deflection and for focusing. The radiation which emerges from the horn radiators 11 through 14 is radiated out by the radiators which are arranged at the right side of the box 18 (for instance radiator 17) with the necessary phase deflection and returns after reflection at a target of these radiators, passes once again over the intermediate phase changers (for instance 16), is radiated out by the corresponding individual radiators (for instance 15) and reaches the individual horn radiators 11 through 14. The horn radiators 11 through 14 are advantageously inclined toward each other in a certain angle α. This achieves the advantage that the radiation diagrams which emerge from the individual horn radiators 11 through 14, are also staggered with regard to one another. It is therefore possible to better utilize the phased-array antenna which costs a remarkable portion of the entire amount which has to be undertaken for the radar arrangement.

Figure 9:
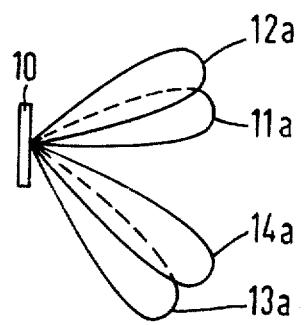
FIG. 9 shows the radiation diagram of a directional antenna according to FIG. 8.

The four radiation lobes 11a through 14a which are different with regard to their frequency, and which come about thereby, are illustrated in FIG. 9. In FIG. 9 the lobe 11a comes from the transmitter S1 and the horn radiator 11, and the lobe 12a from the transmitter S2 and the horn radiator 12. The lobes 12a and 14a are positioned in front of the lobes 11a and 13a; in the whole the lobes form a sort of four-leg arrangement. The illumination of the directional antenna 10 is especially advantageous if the main radiation directions of the horn radiators 11 through 14 are directed toward the center of the antenna. It is especially advantageous if the individual radar signals are pulsed signals. It can also be advantageous, however, if the individual radar signals are modulated with noise and the evaluation of the echo signals is effected by applying correlation methods.

In many cases, mainly if large distances are to be controlled, it might be advantageous if the individual radar signals are radiated out with varying efficiencies; the less efficient radar signals may then preferably be applied for the nearer range and the more efficient radar signals for the more distant range.

Many changes and modifications will become apparent to those skilled in the art without departing from the spirit and scope of my invention and it is to be understood that I wish to include within the patent warranted hereon, all such changes and modifications as may reasonably and properly be included within the scope of my contribution to the art.

What I claim as my invention is:

1. A radar device including a directional antenna comprising a plurality of individual fed dipoles, a central feeding system, and a plurality of phase changers connected between said feeding system and said dipoles, said phase changers being controlled electrically over a range of from between 0° and 360° and the maximum sum of all the phase differences between adjacent feed lines exceeding 360° during beam scanning, means for omitting all multiples of 360° during phase changing, the improvement therein comprising means for transmitting several radar signals from the radar device simultaneously at frequencies which differ sufficiently from one another that the corresponding echo signals from a target can be separately processed, a plurality of different transmitters producing said different radar signals and a plurality of different receivers processing said different radar signals, a plurality of horn antennas, each transmitter-receiver combination being connected to a horn antenna, each of said horn antennas feeding said plurality of dipoles which are arranged at a distance from the horn antennas at one side of a block, said dipoles being connected to said phase changers, a plurality of further dipoles arranged at the other side of said block and respectively connected to said phase changers, and wherein the number of different frequency radar signals is selected to be as near as possible to a maximum value given by the ratio between the required distance resolution for the radar device as a system parameter and the maximum distance resolution obtainable with the given directional antenna due to the omitted multiple 360° arriving radar signals from the different individual dipoles phase shifted at the target.

2. In a radar arrangement according to claim 1, wherein means are provided for radiating the individual radar signals in different directions.

3. In a radar arrangement according to claim 1, wherein means are provided to pulse the individual radar signal.

4. In a radar arrangement according to claim 1 comprising means for modulating the individual radar signals with noise and means for evaluating the echo signals by applying correlation methods.

5. In a radar arrangement according to claim 1, comprising means for radiating the individual radar signals with different efficiencies.

6. In a radar arrangement according to claim 1, wherein said antenna comprises a block structure which is composed of radiation-proof outer walls and which has individual radiators at two outer walls which are opposed to each other, a plurality of phase changers, said radiators connected with each other via said phase changers said phase changers arranged in the inside of the block structure, a number of horn radiators for exciting said radiators, the number of which horn radiators corresponds to that of the radar signals, and a transmission-reception switch assigned to each said pair of transmitters and receivers.

7. In a radar arrangement according to claim 6, wherein the horn radiators are inclined against each other.

8. In a radar arrangement according to claim 6, wherein said horn radiators are arranged in a way that the directional antenna is well illuminated.

9. A radar system comprising a radar device; a directional antenna associated with said radar device and having a resolved distance resolution and a resolved bandwidth limiting resolution; a plurality of radiators included in said antenna; a central feeding device in said radar device for providing simultaneous transmission of a plurality of radar signals at different frequencies; and a plurality of coupling means for coupling said central feeding device to individual ones of said radiators over different length paths, each of said coupling means including an adjustable phase changer to insure that the path differences of said different frequencies is not greater than 360°, and wherein the number of different frequency radar signals is selected to be as near as possible to a maximum value given by the ratio between the required distance resolution for the radar device as a system parameter and the maximum distance resolution obtainable with the given directional antenna due to radar signals at multiples of 360° arriving from the different individual radiators phase shifted at the target.

* * * * *